US008839255B2

(12) United States Patent
Memik et al.

(10) Patent No.: US 8,839,255 B2
(45) Date of Patent: Sep. 16, 2014

(54) SCHEDULING OF THREADS BY BATCH SCHEDULING

(75) Inventors: Gokhan Memik, Evanston, IL (US); Seda Ogrenci Memik, Evanston, IL (US); Bill Mangione-Smith, Kirkland, WA (US)

(73) Assignee: Empire Technology Development LLC, Wilmington, DE (US)

( * ) Notice: Subject to any disclaimer, the term of this patent is extended or adjusted under 35 U.S.C. 154(b) by 552 days.

(21) Appl. No.: 12/508,457

(22) Filed: Jul. 23, 2009

(65) Prior Publication Data

US 2011/0023033 A1    Jan. 27, 2011

(51) Int. Cl.
| G06F 9/46 | (2006.01) |
| G06F 13/00 | (2006.01) |
| G06F 13/28 | (2006.01) |
| G06F 9/48 | (2006.01) |
| G06F 9/38 | (2006.01) |
| G06F 9/50 | (2006.01) |

(52) U.S. Cl.
CPC ............ *G06F 9/4881* (2013.01); *G06F 9/3851* (2013.01); *G06F 9/5016* (2013.01)
USPC .......................................... 718/102; 711/151

(58) Field of Classification Search
CPC .. G06F 9/5016; G06F 9/4881; G06F 13/1647
USPC .......................................................... 718/102
See application file for complete search history.

(56) References Cited

U.S. PATENT DOCUMENTS

| 6,243,788 | B1 | 6/2001 | Franke et al. |
| 6,578,117 | B2 * | 6/2003 | Weber ........................... 711/151 |
| 6,633,298 | B2 | 10/2003 | Ashburn et al. |
| 6,711,644 | B1 | 3/2004 | Accapadi et al. |
| 6,817,011 | B1 | 11/2004 | Reynolds |
| 6,996,821 | B1 * | 2/2006 | Butterworth .................. 718/100 |
| 7,194,561 | B2 | 3/2007 | Weber |
| 7,222,343 | B2 | 5/2007 | Heyrman et al. |
| 7,685,331 | B2 | 3/2010 | Wang et al. |
| 8,019,002 | B2 | 9/2011 | Smith et al. |
| 8,407,443 | B1 | 3/2013 | Nordquist |
| 8,453,150 | B2 * | 5/2013 | Chung ........................... 718/102 |
| 2001/0010066 | A1 | 7/2001 | Chin et al. |
| 2002/0073129 | A1 | 6/2002 | Wang et al. |

(Continued)

FOREIGN PATENT DOCUMENTS

| CN | 1517872 A | 8/2004 |
| CN | 1601474 A | 3/2005 |

(Continued)

OTHER PUBLICATIONS

U.S. Official Action dated Oct. 26, 2011 in U.S. Appl. No. 12/507,696.

(Continued)

*Primary Examiner* — Lewis A Bullock, Jr.
*Assistant Examiner* — Kevin X Lu
(74) *Attorney, Agent, or Firm* — Morrit Hock & Hamroff LLP; Steven S. Rubin, Esq.

(57) ABSTRACT

In accordance with the disclosed subject matter there is provided a method for segregating threads running in a computer system, and executing the threads according to this categorization.

11 Claims, 5 Drawing Sheets

(56) References Cited

U.S. PATENT DOCUMENTS

| | | |
|---|---|---|
| 2003/0074519 A1 | 4/2003 | Weber |
| 2003/0074520 A1 | 4/2003 | Weber |
| 2003/0191907 A1 | 10/2003 | Weber |
| 2004/0143833 A1 | 7/2004 | Heyrman et al. |
| 2004/0261076 A1 | 12/2004 | Kondo |
| 2005/0066332 A1 | 3/2005 | Durai |
| 2005/0108715 A1 | 5/2005 | Kanai et al. |
| 2006/0168383 A1* | 7/2006 | Lin .............................. 710/243 |
| 2007/0150898 A1 | 6/2007 | Duda et al. |
| 2007/0162649 A1 | 7/2007 | Wang et al. |
| 2007/0214343 A1* | 9/2007 | Lindholm et al. ............ 712/220 |
| 2007/0286288 A1 | 12/2007 | Smith et al. |
| 2008/0235686 A1 | 9/2008 | Brenner |
| 2009/0031314 A1 | 1/2009 | Moscibroda et al. |
| 2009/0044189 A1 | 2/2009 | Mutlu et al. |
| 2009/0049443 A1 | 2/2009 | Powers et al. |
| 2009/0138670 A1 | 5/2009 | Mutlu et al. |
| 2009/0147017 A1 | 6/2009 | Jiao |
| 2009/0158299 A1 | 6/2009 | Carter |
| 2009/0165007 A1 | 6/2009 | Aghajanyan |
| 2009/0216962 A1* | 8/2009 | Mutlu et al. .................. 711/151 |
| 2009/0328055 A1 | 12/2009 | Bose et al. |
| 2009/0328058 A1 | 12/2009 | Papaefstathiou et al. |
| 2010/0299671 A1* | 11/2010 | Kinsey .......................... 718/104 |
| 2011/0023037 A1 | 1/2011 | Memik et al. |
| 2011/0023038 A1 | 1/2011 | Memik et al. |
| 2012/0005191 A1 | 1/2012 | Kitsuregawa et al. |
| 2012/0284733 A1 | 11/2012 | Nam et al. |

FOREIGN PATENT DOCUMENTS

| | | |
|---|---|---|
| CN | 101461247 A | 6/2009 |
| JP | 2005-508550 A | 3/2005 |
| JP | 2005508550 A | 3/2005 |
| JP | 2005-100264 A | 4/2005 |
| JP | 2005-517228 A | 6/2005 |
| JP | 2007-34414 A | 2/2007 |
| JP | 2008-541217 A | 11/2008 |
| WO | 03040927 A1 | 5/2003 |
| WO | 2006117746 A | 11/2006 |

OTHER PUBLICATIONS

Biswas et al., "Combining Static and Dynamic Defect-Tolerance Techniques for Nanoscale Memory Systems", Nov. 2007, ICCAD 2007, 6 pages.
Chun et al., "Shapeshifter: Dynamically Changing Pipeline Width and Speed to Address Process Variations", Nov. 2008, MICRO 2008, pp. 411-422, 12 pages.
Kannan et al., "Power Reduction of Functional Units Considering Temperature and Process Variations", Jan. 2008, Proceedings of the 21st International Conference on VLSI Design, 6 pages.
International Search Report dated Nov. 15, 2010 in International Application No. PCT/US10/39907.
G. Memik, S. Memik, Y. Ismail, and R. Joseph, "Self-Adjusting Architectures/Circuits for Improved Performance and Reduced Design Complexity", NSF Grant #0541337, Apr. 2006, www.nsf.gov/awardsearch/showAward.do?AwardNumber=0541337, 4 pages.
M. Santambrogio, M. Giani, S. Ogrenci Memik, "Managing Reconfigurable Resources in Heterogeneous Cores using Portable Pre-Synthesized Templates", in Proc. International Symposium on System-on-Chip, Nov. 19-21, 2007, Tampere, Finland, 4 pages.
Y. Pan, J. Kong, S. Ozdemir, G. Memik, S. W. Chung, "Selective Wordline Voltage Boosting for Caches to Manage Yield under Process Variations", in Proc. of Design Automation Conference (DAC), San Francisco, CA, Jul. 2009, pp. 1-6.
A. Das, B. Ozisikyilmaz, S. Ozdemir, G. Memik, J. Zambreno, A. Choudhary, "Evaluating the Effects of Cache Redundancy on Profit", in Proc. of International Symposium on Microarchitecture (MICRO), Lake Como, Italy, Nov. 2008, pp. 1-11.
A. Mallik, Y. Zhang, G. Memik, "Automated Task Distribution in Multicore Network Processors using Statistical Analysis", in Proc. of International Symposium on Architectures for Networking and Communications Systems (ANCS), Orlando, FL, Dec. 2007, pp. 67-76.
S. Ozdemir, J. C. Ku, A. Mallik, G. Memik, Y. Ismail, "Variable Latency Caches for Nanoscale Processor", in Proc. of Conference for High Performance Computing, Networking, Storage and Analysis (SC), Reno, NV, Nov. 2007, 10 pages.
A. Das, S. Ozdemir, G. Memik, A. Choudhary, "Evaluating Voltage Islands in CMPs under Process Variations", in Proc. of 25th International Conference on Computer Design (ICCD), Lake Tahoe, CA, Oct. 2007, 8 pages.
B. Lin, A. Mallik, P. Dinda, G. Memik, R. Dick, "Power Reduction Through Measurement and Modeling of Users and CPUs", in Proc. of International Conference on Measurement and Modeling of Computer Systems (SIGMETRICS), San Diego, CA, Jun. 2007, 2 pages.
A. Das, S. Ozdemir, G. Memik, Joseph Zambreno and A. Choudhary, "Mitigating the Effects of Process Variations: Architectural Approaches for Improving Batch Performance", in Proc. of Workshop on Architectural Support for Gigascale Integration (ASGI) held in conjunction with International Symposium on Computer Architecture (ISCA), San Diego, CA, Jun. 2007, 11 pages.
Abhishek Das, Serkan Ozdemir, Gokhan Memik, Joseph Zambreno and Alok Choudhary, "Microarchitectures for Managing Chip Revenues under Process Variations", IEEE Computer Architecture Letters (CAL), vol. 6, Jun. 2007, pp. 1-4.
S. Ozdemir, D. Sinha, G. Memik, J. Adams, H. Zhou, "Yield-Aware Cache Achitectures", in Proc. of International Sympsoium on Microachitecture (MICRO), Orlando, FL, Dec. 2009, 11 pages.
J. Long, S. O. Memik, G. Memik, R. Mukherjee, "Thermal Monitoring Mechanisms for Chip Multiprocessors", ACM Transactions on Architecture and Code Optimization (TACO), vol. 5, No. 2, Aug. 2008, pp. 9:1 through 9:33.
S. Liu, Y. Zhang, S. Ogrenci Memik, G. Memik, "An Approach for Adaptive DRAM Temperatures and Power Mangement", in Proc. of International Conference on Supercomputing (ICS), Island of Kos, Greece, Jun. 2008, pp. 63-72.
S. Liu, Y. Zhang, S. Ogrenci Memik, G. Memik, "A Power and Temperature Aware DRAM Architecture", in Proc. of Design Automation Conference (DAC), Anaheim, CA, Jun. 2008, 6 pages.
R. Mukherjee, S. Ogrenci Memik, "Physical Aware Frequency Selection for Dynamic Thermal Management in Multi-Core Systems", in Proc. of IEEE/ACM International Conference on Computer-Aided Design (ICCAD), Nov. 5-9, 2006, San Jose, CA, pp. 547-552.
Iyer, J. et al., "System Memory Power and Thermal Management in Platforms Built on Intel® Centrino® Duo Mobile Technology", Intel® Technology Journal, vol. 10, Issue 02, May 15, 2006, pp. 123-132.
Zhu, Q. et al., "Thermal Managerment of High Power Memory Module for Server Platforms", IEEE, 2008, pp. 572-576.
Canturk Isci, Alper Buyuktosunoglu, Chen-Yong Cher, Pradip Bose, Margaret Martonosi, "An Analysis of Efficient Multi-Core Global Power Management Policies: Maximizing Performance for a Given Power Budget", MICRO 2006: 347-358.
Abella, J., Vera, X., Gonzalez, A., "Penelope: The NBTI-Aware Processor", MICRO 2007, pp. 85-96.
Kevin Brownell, Gu-Yeon Wei and David Brooks. "Evaluation of Voltage Interpolation to Address Process Variations," International Conference on Computer Aided Design (ICCAD), San Jose, CA, Nov. 2008, 8 pages.
Xiaoyao Liang, Gu-Yeon Wei, and David Brooks. "ReVIVaL: A Variation-Tolerant Architecture Using Voltage Interpolation and Variable Latency," 35th International Symposium on Computer Architecture (ISCA-35), Beijing, China, Jun. 2008, 12 pages.
Xiaoyao Liang and David Brooks. "Mitigating the Impact of Process Variations on Processor Register Files and Execution Units," 39th International Symposium on Microarchitecture (MICRO-39), Orlando, FL, Dec. 2006, 11 pages.
Abhishek Tiwari, Smruti Sarangi, and Josep Torrellas, "ReCycle: Pipeline Adaptation to Tolerate Process Variation", 34th Annual International Symposium on Computer Architecture (ISCA), Jun. 2007, 12 pages.
Bowman, K.A., Duvall, S.G., Meindl, J.D., "Impact of die-to-die and within-die parameter fluctuations on the maximum clock frequency distribution", ISSCC 2001, pp. 278-279.

(56) References Cited

OTHER PUBLICATIONS

S. Borkar, "Designing reliable systems from unreliable components: the challenges of transistor variability and degradation", IEEE Micro, 2005, pp. 10-16.
P. Ndai et al., "Within-Die Variation-Aware Scheduling in Superscalar Processors for Improved Throughput", IEEE Transactions on Computers, 2008, pp. 940-951.
Michael D. Powell, Arijit Biswas, Shantanu Gupta, and Shubhendu S. Mukherjee, "Architectural Core Salvaging in a Muti-Core for Hard-Error Tolerance", in Proc. of International Symposium on Computer Architecture (ISCA), Austin, TX, Jun. 2009, 12 pages.
Ke Meng, Russ Joseph, "Process variation aware cache leakage management", ISPLED 2006: 262-267.
Ke Meng, Frank Huebbers, Russ Joseph, Yehea Ismail, "Modeling and Characterizing Power Variability in Multicore Architectures", ISPASS 2007: 146-157.
Ke Meng, Frank Huebbers, Russ Joseph, and Yehea Ismail, "Physical Resource Matching Under Power Asymmetry", in Proc. of P=ac2 2006, pp. 1-10.
Ke Meng, Russ Joseph, Robert P. Dick, Li Shang, "Multi-optimization power management for chip multiprocessors", PACT 2008: 177-186.
Somnath Paul, Saibal Mukhopadhyay and Swarup Bhunia, "A Variation-Aware Preferential Design Approach for Memory Based Reconfigurable Computing," in IEEE International Conference on Computer Aided Design (ICCAD), 2009, pp. 180-183.
J.A. Winter and D.H. Albonesi, "Scheduling Algorithms for Unpredictably Heterogeneous CMP Architectures", in Proc. of 38th International Conference on Dependable Systems and Networks, Jun. 2008, 10 pages.
Eren Kursun and Chen-Yong Cher, "Variation-aware thermal characterization and management of multi-core architectures", in Proc. of ICCD 2008, pp. 280-285.
Ulya R. Karpuzcu, Brian Greskamp and Josep Torrellas, "The BubbleWrap Many-Core: Popping Cores for Sequential Acceleration", International Symposium on Microarchitecture (MICRO), Dec. 2009, 12 pages.
Smruti Sarangi, Brian Greskamp, Abhishek Tiwari, and Josep Torrellas, "EVAL: Utilizing Processors with Variation-Induced Timing Errors", 41st International Symposium on Microarchitecture (MICRO), Nov. 2008, 12 pages.
Radu Teodorescu and Josep Torrellas, "Variation-Aware Application Scheduling and Power Management for Chip Multiprocessors", 35th Annual International Symposium on Computer Architecture (ISCA), Jun. 2008, 12 pages.
Bower F. A., Sorin D. J., and Cox L. P., "The Impact of Dynamically Heterogeneous Multicore Processors on Thread Scheduling", IEEE Micro 28, May 3, 2008, pp. 17-25.
Tam D., Azimi R., and Stumm M., "Thread clustering: sharing-aware scheduling on SMP-CMP-SMT multiprocessors", In Proceedings of the Sigops/Eurosys European Conference on Computer Systems. Lisboa, Portugal. Mar. 2007, 12 pages.
Anderson J.H., Calandrino J.M., Devi U.C., "Real-Time Scheduling on Multicore Platforms", In Proceedings of the Real-Time and Embedded Technology and Applications Symposium. Apr. 2006, 12 pages.
Durbhakula M., "Sharing-aware OS scheduling algorithms for multi-socket multi-core servers", In Proceedings of the international Forum on Next-Generation Multicore/Manycore Technologies. Cairo, Egypt. Nov. 2008, 10 pages.
Siddha S., Pallipadi V., Mallick A., "Process Scheduling Challenges in the Era of Multi-Core Processors", Intel® Technology Journal. Nov. 2007, 361-370.
Li T., Baumberger D., and Hahn S., "Efficient and scalable multiprocessor fair scheduling using distributed weighted round-robin", In Proceedings of the Symposium on Principles and Practice of Parallel Programming. Raleigh, NC. Feb. 2009, pp. 1-10.
Rajagopalan M., Lewis B. T., and Anderson T. A., "Thread scheduling for multi-core platforms", In Proceedings of the USENIX Workshop on Hot Topics in Operating System. San Diego, CA. May 2007, 9 pages.
El-Moursy A., Garg R., Albonesi D.H., Dwarkadas S., "Compatible phase co-scheduling on a CMP of multi-threaded processors", In Proceedings of the Parallel and Distributed Processing Symposium. Apr. 2006, pp. 1-10.
Puppin D., Stephenson M., Amarasinghe S., Martin M., and O'reilly U., "Adapting convergent scheduling using machine-learning", In proceedings of the International workshop on languages and compilers for parallel computing. Oct. 2003, 15 pages.
Negi A., Kishore K.P. "Applying Machine Learning Techniques to Improve Linux Process Scheduling", IEEE TENCON. Nov. 2005, 6 pages.
Wang Z., and O'Boyle M. F., "Mapping parallelism to multi-cores: a machine learning based approach", In Proceedings of the Symposium on Principles and Practice of Parallel Programming. Raleigh, NC. Feb. 2009, 10 pages.
Tucker A., and Gupta A., "Process control and scheduling issues for multiprogrammed shared-memory multiprocessors", In Proceedings of the Symposium on Operating Systems Principles. 1989, pp. 159-166.
Jiang Lin, Hongzhong Zheng, Zhichun Zhu, Eugene Gorbatov, Howard David, Zhao Zhang, "Software thermal management of dram memory for multicore systems", SIGMETRICS 2008: 337-348.
Jiang Lin, Hongzhong Zheng, Zhichun Zhu, Howard David, Zhao Zhang, "Thermal modeling and management of DRAM memory systems", ISCA 2007: 312-322.
Hongzhong Zheng, Jiang Lin, Zhao Zhang, Eugene Gorbatov, Howard David, Zhichun Zhu, "Mini-rank; Adaptive DRAM architecture for improving memory power efficiency", MICRO 2008: 210-221.
Hongzhong Zheng, Jiang Lin, Zhao Zhang, Zhichun Zhu, "Memory Access Scheduling Schemes for Systems with Multi-Core Processors", ICPP 2008: 406-413.
Hongzhong Zheng, Jiang Lin, Zhao Zhang, Zhichun Zhu, "Decoupled DIMM: building high-bandwidth memory system using low-speed DRAM devices", ISCA 2009: 255-266.
Engin Ipek, Onur Mutlu, José F. Martinez, and Rich Caruana, "Self Optimizing Memory Controllers: A Reinforcement Learning Approach", Proceedings of the 35th International Symposium on Computer Architecture (ISCA), pp. 39-50, Beijing, China, Jun. 2008.
Russ Joseph, "Exploring Salvage Techniques for Multi-core Architectures", HPCRI-2005 Workshop in Conjunction with HPCA-2005, 6 pages.
Seda Memik, Gokhan Memik, "SHF: Small: Thermal-Aware High-Performance DRAM Architectures in Multicore Technologies", NSF Grant# 0916746, Sep. 2009, 2 pages.
Gokhan Memik, "CAREER: Holistic Computer Architectures for Nanoscale Processors", NSF Grant#0747201, Apr. 2008, 3 pages.
Sahoo, S.K., et al., "Using Likely Program Invariants to Detect Hardware Errors", Appears in Proceedings of the 38th International Conference on Dependable Systems and Networks (DSN), Jun. 2008, pp. 1-10.
Ernst, D. et al., "Razor: A Low-Power Pipeline Based on Circuit-Level Timing Speculation", Appears in the 36th Annual International Symposium on Microarchitecture (MICRO-36), 12 pages.
Choi, J. et al., "Thermal-aware Task Scheduling at the System Software Level", ISLPED '07, Aug. 27-29, 2007, Portland, OR, pp. 213-218.
B. Lin, A. Mallik, P. Dinda, G. Memik, R. Dick, "User- and Process-Driven Dynamic Voltage and Frequency Scaling", in Proc. of International Symposium on Performance Analysis of Systems and Software (ISPASS), Boston, MA, Apr. 2009, 12 pages.
Abhishek Das, David Nguyen, Joseph Zambreno, Gokhan Memik, Alok Choudhary, "An FPGA-based Network Intrusion Detection Architecture", IEEE Transactions on Information Forensics and Security (TIFS), vol. 3, Issue 1, Mar. 2008, pp. 118-132.
S. Pati, R. Narayanan, G. Memik, A. Choudhary, J. Zambreno, "Design and Implementation of an FPGA Architecture for High-

(56) References Cited

OTHER PUBLICATIONS

Speed Network Feature Extraction", in Proc. of International Conference on Field-Programming Technology (FPT), Kitakyushu, Japan, Dec. 2007, 8 pages.
D. Nguyen, A. Das, G. Memik, A. Choudhary, "A Reconfigurable Architecture for Network Intrusion Detection using Principal Component Analysis", in Proc. of Fourteenth International Symposium on Field-Programmable Gate Arrays (FPGA), Monerey, CA, Feb. 2006, 2 pages.
D. Nguyen, G. Memik, S. Ogrenci Memik, A. Choudhary, "Real-Time Feature Extraction for High Speed Networks", in Proc. of International Conference on Field Programmable Logic and Applications (FPL), Tampere, Finland, Aug. 2005.
D. Nguyen, J. Zambreno, G. Memik, "Flow Monitoring in High-Speed Networks with 2D Hash Tables", in Proc. of Field-Programmable Logic and its Applications (FPL), Antwerp, Belgium, Aug.-Sep. 2004, 5 pages.
A. Shye, Y. Pan, B. Scholbrock, J. S. Miller, G. Memik, P. Dinda, R. Dick, "Power to the People: Leveraging Human Physiological Traits to Control Microprocessor Frequency", in Proc. of International Symposium on Microarchitecture (MICRO), Lake Como, Italy, Nov. 2008, 12 pages.
A. Shye, B. Ozisikyilmaz, A. Mallik, G. Memik, P. Dinda, R. Dick, A. Choudhary, "Learning and Leveraging the Relationship between Architecture-Level Measurements and Individual User Satisfaction", in Proc. of International Symposium on Computer Architecture (ISCA), Beijing, China, Jun. 2008, 12 pages.
A. Mallik, J. Cosgrove, R. Dick, G. Memik, P. Dinda, "PICSEL: Measuring User-Perceived Performance to Control Dynamic Frequency Scaling", in Proc. Of Architectural Support for Programming Languages and Operating Systems (ASPLOS), Seattle, WA, Mar. 2008, pp. 70-79.
P. Dinda, G. Memik, R. Dick, B. Lin, A. Mallik, A. Gupta, S. Rossoff, "The User in Experimental Computer Systems Research", in Proc. of FCRC Workshop on Experimental Computer Science (ExpCS), San Diego, CA, Jun. 2007, pp. 1-12.
Arindam Mallik, Bin Lin, Gokhan Memik, Peter Dinda, Robert Dick, "User-Driven Frequency Scaling", IEEE Computer Architecture Letters (CAL), vol. 5, No. 2, 2006, 4 pages.
R. Schweller, Z. Li, Y. Chen, Y. Gao, A. Gupta, Y. Zhang, P. Dinda, M. Kao, G. Memik, "Reversible Sketches: Enabling Monitoring and Analysis over High-speed Data Streams", IEEE/ACM Transactions on Networking (ToN), vol. 15, No. 5, Oct. 2007, pp. 1059-1072.
R. Schweller, Z. Li, Y. Chen, Y. Gao, A. Gupta, Y. Zhang, P. Dinda, M. Kao, G. Memik, "Reverse Hashing for High-speed Network Monitoring: Algorithms, Evaluation, and Applications", in Proc. of 25th Annual Joint Conference of the IEEE Computer and Communications Societies (INFOCOM), Barcelona, Spain, Apr. 2006, 12 pages.
A. Mallik, B. Lin, P. Dinda, G. Memik, R. Dick, "Process and User Driven Dynamic Voltage and Frequency Scaling". Tech. Rep. NWU-EECS-06-11, Department of Electrical Engineering and Computer Science, Northestern University, Aug. 2006, 18 pages.
Ja Chun Ku, Serkan Ozdemir, Gokhan Memik, Yehea Ismail, "Thermal Management of On-Chip Caches through Power Density Minimization", IEEE Transactions on Very Large Scale Integration Systems (VLSI), vol. 15, Issue 5, pp. 592-604, May 2007.
J. C. Ku, S. Ozdemir, G. Memik, Y. Ismail, "Power Density Minimization for Highly-Associative Caches in Embedded Processors", in Proc. of Great Lakes Symposium on VLSI (GLSVLSI), Philadelphia, PA, Apr.-May 2006, pp. 100-104.
J. C. Ku, S. Ozdemir, G. Memik, Y. Ismail, "Thermal Management of On-Chip Caches Through Power Density Minimization", in Proc. of International Symposium on Microarchitecture (MICRO), Barcelona, Spain, Nov. 2005, 11 pages.
Y. Liu, G. Memik, G. Reinman, "Reducing the Energy of Speculative Instruction Schedulers", in Proc. of International Conference on Computer Design (ICCD), San Jose, CA, Oct. 2005, 6 pages.
Y. Liu, A. Shayesteh, G. Memik, G. Reinman, "Tornado Warning: the Perils of Selective Replay in Multithread Processors", in Proc. of International Conference on Computer Design (ICS), Boston, MA, Jun. 2005, 10 pages.
G. Chen, Mahmut T. Kandemir, Mary Jane Irwin, Gokhan Memik, "Compiler-directed selective data protection against soft errors". ASP-DAC 2005; 713-716.
Rajarshi Mukherjee, Seda Ogrenci Memik, Gokhan Memik, "Temperature-aware resource allocation and binding in high-level synthesis". DAC 2005: 196-201.
Gokhan Memik, Glenn Reinman, William H. Mangione-Smith, "Precise Instruction Scheduling", Journal of Instruction-Level Parallelism (JILP), vol. 7, Jan. 2005, pp. 1-21.
Y. Liu, A. Shayesteh, G. Memik, G. Reinman, "The Calm Before the Storm: Reducing Replays in the Cyclone Scheduler", in Proc. of P=ac2: First Watson Conference on Interaction between Architecture, Circuits, and Compilers (P=ac2), Yorktown Heights, NY, Oct. 2004, 8 pages.
Y. Liu, A. Shayesteh, G. Memik, G. Reinman, "Scaling the Issue Window with Look-Ahead Latency Prediction", In Proc. of International Conference on Supercomputing (ICS), Saint-Malo, France, Jun.-Jul. 2004, pp. 217-226.
Rajarshi Mukherjee, Seda Ogrenci Memik, Gokhan Memik, "Peak temperature control and leakage reduction during binding in high level synthesis", ISLPED 2005: 251-256.
Gokhan Memik, Mahmut T. Kandemir, Ozcan Ozturk, "Increasing Register File Immunity to Transient Errors", Date 2005: 586-591.
Gokhan Memik, Masud H. Chowdhury, Arindam Mallik, Yehea I. Ismail, "Engineering Over-Clocking: Reliability-Performance Trade-Offs for High-Performance Register Files". DSN 2005: 770-779.
Arindam Mallik, Gokhan Memik, "A Case for Clumsy Packet Processors", MICRO 2004: 147-156.
Gokhan Memik, Mahmut T. Kandemir, Alok N. Choudhary, Ismail Kadayif, "An Integrated Approach for improving Cache Behavior", Date 2003:10796-10801.
Gokhan Memik, William H. Mangione-Smith, "Increasing power efficiency of multi-core network processors through data filtering", CASES 2002: 108-116.
Gokhan Memik, Mahmut T. Kandemir, Wei-Keng Liao, Alok Choudhary, "Multi-Collective I/O: A technique for exploiting inter-file access patterns", ACM Transactions on Storage (ToS), vol. 2, Issue 3, pp. 349-369, Aug. 2006.
G. Memik, M. Kandemir, A. Mallik, "Load Elimination for Low-Power Embedded Processors", in Proc. of Great Lakes Symposium on VLSI (GLSVLSI), Chicago, IL, Apr. 2005, pp. 282-285.
Gokhan Memik, Mahmut T. Kandemir, Alok N. Choudhary, "Exploiting Inter-File Access Patterns Using Multi-Collective I/O", FAST 2002: 245-258.
Gokhan Memik, Glenn Reinman, William H. Mangione-Smith, "Just Say No: Benefits of Early Cache Miss Determination", in Proc. of Ninth International Symposium on High Performance Computer Architecture (HPCA), Anaheim, CA, Feb. 2003, 10 pages.
G. Memik, G. Reinman, W. H. Mangione-Smith, "Reducing Energy and Delay Using Efficient Victim Caches", in Proc. of International Symposium on Low Power Electronics and Design (ISLPED), Seoul, Korea, Aug. 2003, 262-265.
S. O. Memik, G. Memik, R. Jafari, E. Kursun, "Global Resource Sharing for Synthesis of Control Data Flow Graphs on FPGAs", in Proc. of 40th Automation Conference (DAC), Anaheim, CA, Jun. 2003, pp. 604-609.
Gokhan Memik and William H. Mangione-Smith, "NEPAL: A Framework for Efficiently Structuring Applications for Network Processors", in Proc. of Second Workshop on Network Processors (NP), held in conjunction with HPCA, Anaheim, CA, Feb. 2003, 13 pages.
Andreas Moshovos, Gokhan Memik, Babak Falsafi, Alok Choudhary, "JETTY: Filtering Snoops for Reduced Energy Consumption in SMP Servers", in the Proc. of Seventh International Symposium on High Performance Computer Architecture (HPCA), Monterey, Mexico, Jan. 2001, 12 pages.
Gokhan Memik, Mahmut T. Kandemir, Alok Choudhary, "Design and Evaluation of a Smart Disk Cluster for DSS Commercial

(56) References Cited

OTHER PUBLICATIONS

Workloads", Journal of Parallel and Distributed Computing (JPDC), vol. 61, Issue 11, pp. 1633-1664, 2001.

Gokhan Memik, Mahmut T. Kandemir, Alok N. Choudhary, "Design and Evaluation of a Compiler-Directed Collective I/O Technique", Euro-Par 2000:1272.

S. Borkar, T. Karnik, S. Narendra, J. Tschanz, A. Keshavarzi, and V. De, "Parameter variations and impact on circuits and microarchitecture," in Design Automation Conference, Jun. 2003, pp. 338-342.

J. Dorsey, S. Searles, M. Ciraula, S. Johnson, N. Bujanos, D. Wu, M. Braganza, S. Meyers, E. Fang, and R. Kumar, "An integrated quadcore Opteron processor," in International Solid State Circuits Conference, Feb. 2007, pp. 102-103.

E. Humenay, D. Tarjan, and K. Skadron, "Impact of process variations on multicore performance symmetry," in Design, Automation and Test in Europe, Apr. 2007, pp. 1653-1658.

R. McGowen, C. A. Poirier, C. Bostak, J. Ignowski, M. Millican, W. H. Parks, and S. Naffziger, "Power and temperature control on a 90-nm Itanium family processor," Journal of Solid-State Circuits, Jan. 2006.

Alex Shye, Lei Yang, Xi Chen, Berkin Ozisikyilmaz, Arindam Mallik, Bin Lin, Peter A. Dinda, Gokhan Memik, Robert P. Dick, "Empathic Computer Architectures and Systems", in Architectural Support for Programming Languages and Operating Systems (ASPLOS)—Wild and Crazy Ideas VI (ASPLOS-WACI), Seattle, WA, Mar. 2008, 1 page.

Bloom filter "Wikipedia", en.wikipedia.org/w/index.php?title=Bloom_filter&printable=yes, Jul. 13, 2009, 10 pages.

Onur Mutlu and Thomas Moscibroda, "Parallelism-Aware Batch Scheduling: Enhancing both Performance and Fairness of Shared DRAM Systems," ISCA, pp. 63-74, 2008 (2008 International Symposium on Computer Architecture).

Skadron, K. et al., "Temperature-Aware Microarchitecture", Published in the Proceedings of the 30$^{th}$ International Symposium on Computer Architecture, pp. 1-12, (Jun. 9-11, 2003).

Chung-Hsiang Lin, Chia-Lin Yang, Ku-Jei King , "PPT Joint performance/power/thermal management of DRAM memory for multicore systems", Proceedings of the 14th ACM/IEEE International Symposium on Low Power, Electronics and Design (ISLPED), Aug. 2009.

Hong, S. et al., "Process Variation Aware Thread Mapping for Chip Multiprocessors", 978-3-9810801-5-5/DATE09 © 2009 EDAA.

Chen, R. et al., "Toward Secure Distributed Spectrum Sensing in Cognitive Radio Networks", the paper was presented in part in the First IEEE Workshop on Networking Technologies for Software Defined Radio (SDR) Networks, Sep. 2006, Reston, VA.

R. Chen, J.-M. Park, and K. Bian, "Robust distributed spectrum sensing in cognitive radio networks," IEEE Infocom 2008 miniconference, Apr. 2008, 9 pages.

R. Bitirgen, E. Ipek, and J.F. Martinez, "Coordinated Management of Multiple Interacting Resources in Chip Multiprocessors: A Machine Learning Approach", Proc. of Intl. Symposium on Microarchitecture, Lake Como, Italy, Nov. 2008, 12 pages.

Chang Joo Lee, Onur Mutlu, Veynu Narasiman, and Yale N. Patt, "Prefetch-Aware DRAM Controllers", Proceedings of the 41st International Symposium on Microarchitecture (MICRO), pp. 200-209, Lake Como, Italy, Nov. 2008.

Onur Mutlu and Thomas Moscibroda, "Stall-Time Fair Memory Access Scheduling for Chip Multiprocessors", Proceedings of the 40th International Symposium on Microarchitecture (MICRO), pp. 146-158, Chicago, IL, Dec. 2007.

A. Das, S. Misra, S. Joshi, J. Zambreno, G. Memik and A. Choudhary. "An Efficient FPGA Implementation of Principal Component Analysis based Network Intrusion Detection System." In Proc. of Design, Automation & Test in Europe (DATE), Munich, Germany, Mar. 2008, pp. 1160-1165.

Arindam Mallik and Gokhan Memik, "Low Power Correlating Caches for Network Processors", Journal of Low Power Electronics (JOLPE), vol. 1, No. 2, pp. 108-118, Aug. 2005, pp. 1-21.

L. Zhang, L. Bai, R. P. Dick, L. Shang, and R. Joseph, "Process variation characterization of chip-level multiprocessors," in Proc. of Design Automation Conference (DAC), San Francisco, CA, Jul. 2009, 4 pages.

Unsal, O. S., J. W. Tschanz, K. Bowman, V. De, X. Vera, A. Gonzalez, and O. Ergin, "Impact of Parameter Variations on Circuits and Microarchitecture." IEEE Micro, Nov.-Dec. 2006. 26(6): pp. 30-39.

M. Goudarzi, T. Ishihara, H. Yasuura, "A Software Technique to Improve Yield of Processor Chips in Presence of Ultra-Leaky SRAM Cells Caused by Process Variation," In Proc. of Asia and South-Pacific Design Automation Conference (ASP-DAC'07), Japan, Jan. 2007, pp. 878-883.

Bjorn De Sutter, Variability-Aware PrOgram Relocation Project, Sep. 2008 (www.hipeac.net/system/files/PhDVAPOR_eng.pdf), 5 pages.

M. Goudarzi, T. Ishihara, Hiroto Yasuura, "Variation Aware Compilation for Improving Energy-Efficiency of Nanometer Processor Caches," Workshop on Compiler-Assisted SoC Assembly (CASA'06), Seoul, Oct. 27, 2006 www.slrc.kyushu-u.ac.jp/~ishihara/CREST/CASA2006.pdf), 47 pages.

Memik, G. et al., "Self-Adjusting Architectures for Improved Performance, Yield, and Reduced Design Time", www.eecs.northwestern.edu/~memik/projects/selfadjusting/index.html), May 13, 2010, 4 pages.

International Search Report dated Apr. 5, 2011 in International Application PCT/US10/39944.

United States PTO, Office Action for application with U.S. Appl. No. 12/507,696 dated Feb. 14, 2012.

United States PTO, Office Action for application with U.S. Appl. No. 12/507,671 dated Mar. 28, 2012.

United States PTO, Office Action for application with U.S. Appl. No. 12/507,671 dated Mar. 28, 2012, 19 pages Amendment and Response for application with U.S. Appl. No. 12/507,671 dated May 1, 2012, 12 pages.

United States PTO, Office Action for application with U.S. Appl. No. 12/507,671 dated Jun. 20, 2012, 24 pages.

Preliminary Amendment for application with U.S. Appl. No. 12/507,671 dated Aug. 13, 2012, 9 pages United States PTO, Office Action for application with U.S. Appl. No. 12/507,696 dated Oct. 26, 2011, 32 pages.

Amendment and Response for application with U.S. Appl. No. 12/507,696 dated Jan. 26, 2012, 14 pages.

Response pursuant to rule 1.116 for application with U.S Appl. No. 12/507,696 dated Apr. 16, 2012, 11 pages.

United States PTO, Advisory Action for application with U.S. Appl. No. 12/507,696 dated May 7, 2012, 8 pages.

Preliminary Amendment for application with U.S. Appl. No. 12/507,696 dated Jun. 8, 2012, 11 pages.

Ryoo, S. et al., "Optimization principles and application performance evaluation of a multithreaded GPU using CUDA," Proceedings of the 13th ACM SIGPLAN Symposium on Principles and Practices of Parallel programming, pp. 73-82, 2008.

International Search Report and Written Opinion for International Patent Application No. PCT/US10/39912 mailed Feb. 9, 2012, 7 pages.

Reiji Suda, "A Survey on Task Scheduling for Heterogeneous Parallel Computing Environments," IPSJ Transactions on Advanced Computing Systems, vol. 47, No. 18 pp. 92-114, 2006 (English Abstract).

* cited by examiner

SCHEDULING OF THREADS BY BATCH SCHEDULING

REFERENCE TO RELATED APPLICATIONS

This application is related to the following co-pending applications, application Ser. No. 12/507,686 entitled "Batch Scheduling With Segregation" filed Jul. 22, 2009 and application Ser. No. 12/507,671 entitled "Application Selection of Memory Request Scheduling" filed Jul. 22, 2009.

BACKGROUND

In a chip-multiprocessor (CMP) system, the DRAM system is shared among cores. In a shared DRAM system, requests from a thread can not only delay requests from other threads by causing bank conflicts, bus conflicts or row-buffer conflicts, but they can also destroy DRAM-bank-level parallelism of other threads. Requests with latencies that would otherwise have been overlapped could effectively become serialized. As a result, both fairness and system throughput may degrade, and some threads can starve for long time periods.

One approach to providing fair and high-performance memory scheduling is using a scheduling algorithm called parallelism-aware batch scheduling (PAR-BS), as shown in Onur Mutlu and Thomas Moscibroda, "Parallelism-Aware Batch Scheduling: Enhancing both Performance and Fairness of Shared DRAM Systems," *ISCA*, pp. 63-74, 2008 (2008 International Symposium on Computer Architecture), all of which is incorporated by reference herein, except where inconsistent with the present application. PAR-BS design is based on two ideas: (1) request batching; and (2) parallelism-aware memory scheduling. First, PAR-BS processes DRAM requests in batches to provide fairness and to avoid starvation of requests. Second, to optimize system throughput, PAR-BS employs a parallelism-aware DRAM scheduling policy that aims to process requests from a thread in parallel in the DRAM banks, thereby reducing the memory-related stall-time experienced by the thread. PAR-BS incorporates support for system-level thread priorities and can provide different service levels, including purely opportunistic service, to threads with different priorities.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings:

DETAILED DESCRIPTION

Figure 1:
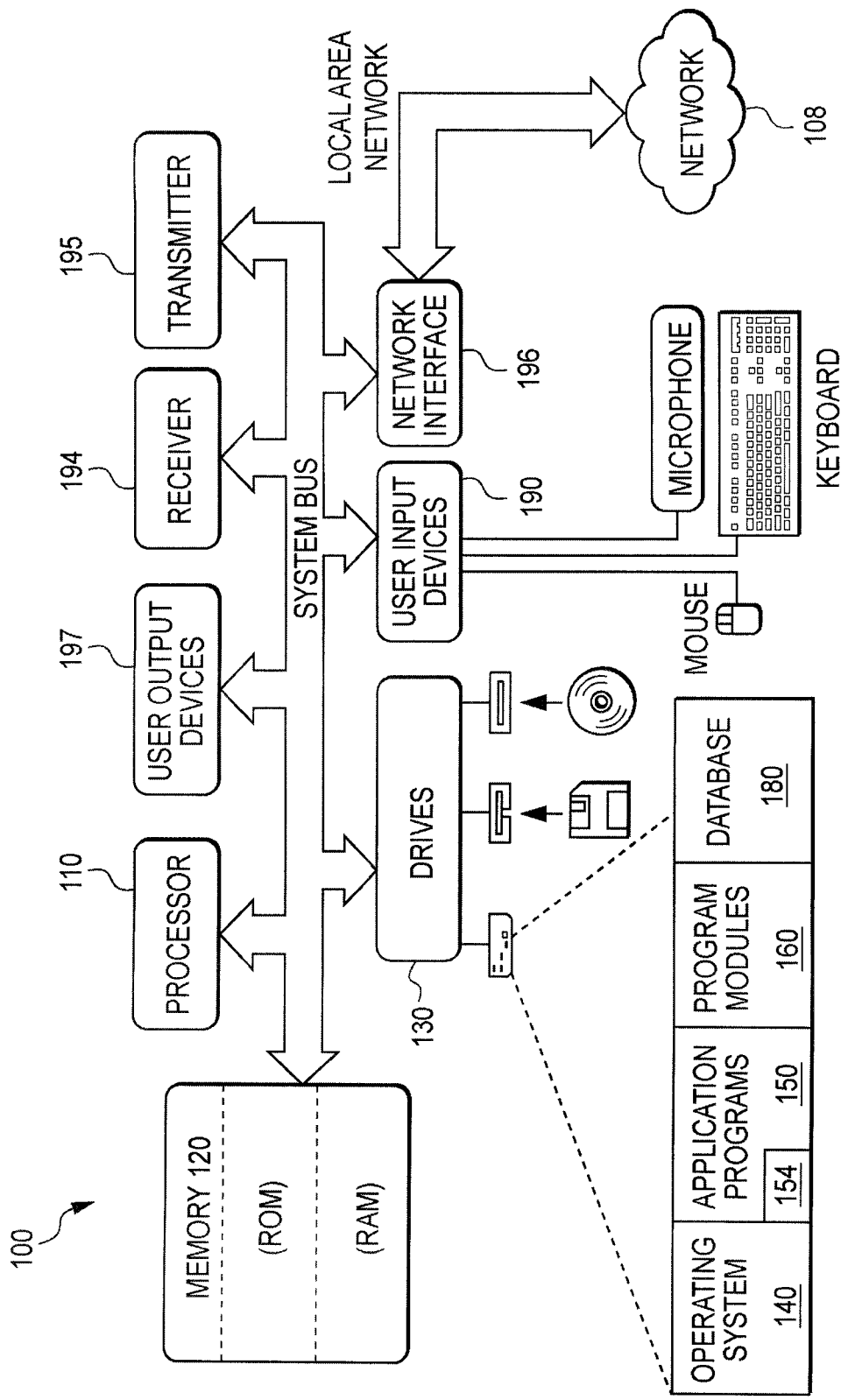
FIG. 1 illustrates a computer system.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, systems and computer program products related to scheduling of threads by batch scheduling. The present disclosure makes use of the discovery of grouping threads into batches, based upon certain criteria. The threads may be grouped into batches in a variety of ways, such as: (1) good design threads and bad design threads, based on how well the threads are designed for use with parallel processors; (2) cooperative threads and non-cooperative threads, based on how efficiently the threads work with other threads; (3) first application, second application and third application threads, based on the application program from which the thread originated; (4) large request threads, optionally medium request threads and small request threads, based on the relative number of requests for data in memory the threads make, for example large request thread may make an average number of request or greater, and small request threads may make a number of requests less than an average number. Other criteria for grouping threads into batches may include assigning an importance to each thread, for example high importance or low importance, or assigning importance values and batching threads with similar or the same importance values, together. Still other criteria for grouping threads into batches may include grouping based on past compatibility data collect when previously executing the threads, with the data stored in a ghost page associated with each thread; or the data could be stored in a freeze dried ghost page provided as part of the application program from which the thread issued, the freeze dried ghost page containing compatibility data of the threads provided with the application program. Many other variations are possible.

In some examples, methods may be described for segregating threads running in a computer system. The computer system may include an operating system. Some described methods may include segregating the threads based on their efficiency into good threads and bad threads. In some examples, threads that can extract data in parallel from the memory banks may be considered good threads and threads that do not extract data in parallel from the memory banks may be considered bad threads. The methods may also include forming a first batch of threads comprising primarily good threads, and forming a second batch of threads comprising primarily bad threads.

In some additional examples, methods for segregating threads running in a computer system may be described. The computer system may include an operating system. Example methods may include determining which threads operate efficiently with each other and which threads do not operate efficiently with each other. Threads that operate efficiently with each other may extract data from different memory banks, and threads that do not operate efficiently with each other may extract data from the same memory banks. Example methods may also include forming a first batch of threads comprising primarily threads that operate efficiently with each other and forming a second batch of threads comprising primarily threads that do not operate efficiently with each other.

In yet other examples, methods may be described for segregating threads running in a computer system. The computer system may include an operating system. The example methods may include segregating the threads based on criteria into a first and second thread type. The example methods may also include forming a first batch comprising threads which are primarily of the first thread type and forming a second batch comprising threads which are primarily of the second thread type.

FIG. 1 illustrates a computer system arranged according to at least some embodiments of the present disclosure. FIG. 1 illustrates a computer 100 including a processor 110, memory 120 and one or more drives 130. The drives 130 and their associated computer storage media may provide storage of computer readable instructions, data structures, program modules and other data for the computer 100. Drives 130 may include an operating system 140, application programs 150, program modules 160, and database 180. Operating system 140 and/or application programs 150, for example, may include program instructions for causing the computer 100 to carry out the functions and/or operations specified in FIG. 4, for example, batch scheduling application 154. Computer 100 may include user input devices 190 through which a user may enter commands and data. Input devices may include an electronic digitizer, a microphone, a keyboard and pointing device, commonly referred to as a mouse, trackball or touch pad. Other input devices may include a joystick, game pad, satellite dish, scanner, or the like.

These and other input devices may be coupled to processor 110 through a user input interface that may be coupled to a system bus or it may be connected by other interface or bus structures, such as a parallel port, game port or a universal serial bus (USB), or the like. Computer 100 may include peripheral output devices such as speakers, a printer, or a display 202, which may be connected through an output peripheral interface 194 or the like.

Computer 100 may be configured to operate in a networking environment using logical connections to one or more computers, such as a remote computer connected to network interface 196 The remote computer may be a personal computer (PC), a server, a router, a network PC, a peer device or other common network node, and may include many or all of the elements described above relative to computer 100.

Networking environments may include offices, enterprise-wide area networks (WAN), local area networks (LAN), intranets and the Internet. In an example, computer 100 may be the source machine from which data is being migrated and the remote computer may comprise the destination machine, or vice versa. Source and destination machines may not be connected by a network 108 or any other means, but instead, data may be migrated via any media capable of being written by the source platform and read by the destination platform or platforms. In a LAN or WLAN networking environment, computer 100 may be connected to the LAN or WAN through a network interface 196 or an adapter. In a WAN networking environment, computer 100 may include a modem or other means for establishing communications over the WAN, such as the Internet or network 108. Other means of establishing a communications link between the computers may be used.

A computer peripheral may include any device coupled to the processor 110 and the memory 120 of the computer 100 through the system bus. A computer peripheral may include any device connected with the output peripheral interface, including the display 202, the printer, or speakers, drives 130, user input devices 190 such as the keyboard, the mouse, and the microphone, and the network interface 196. Components of the computer peripheral may include any device within a computer peripherals which may use power and may be any device, such as speakers, lighting elements such as light emitting diodes, or backlights used to provide lighting for displays, display elements, such as LCD, LED, OLED, CRT, or Plasma displays, or semiconductor chips such as a central processing unit (CPU), a graphic processing unit (GPU), memory.

Figure 2:
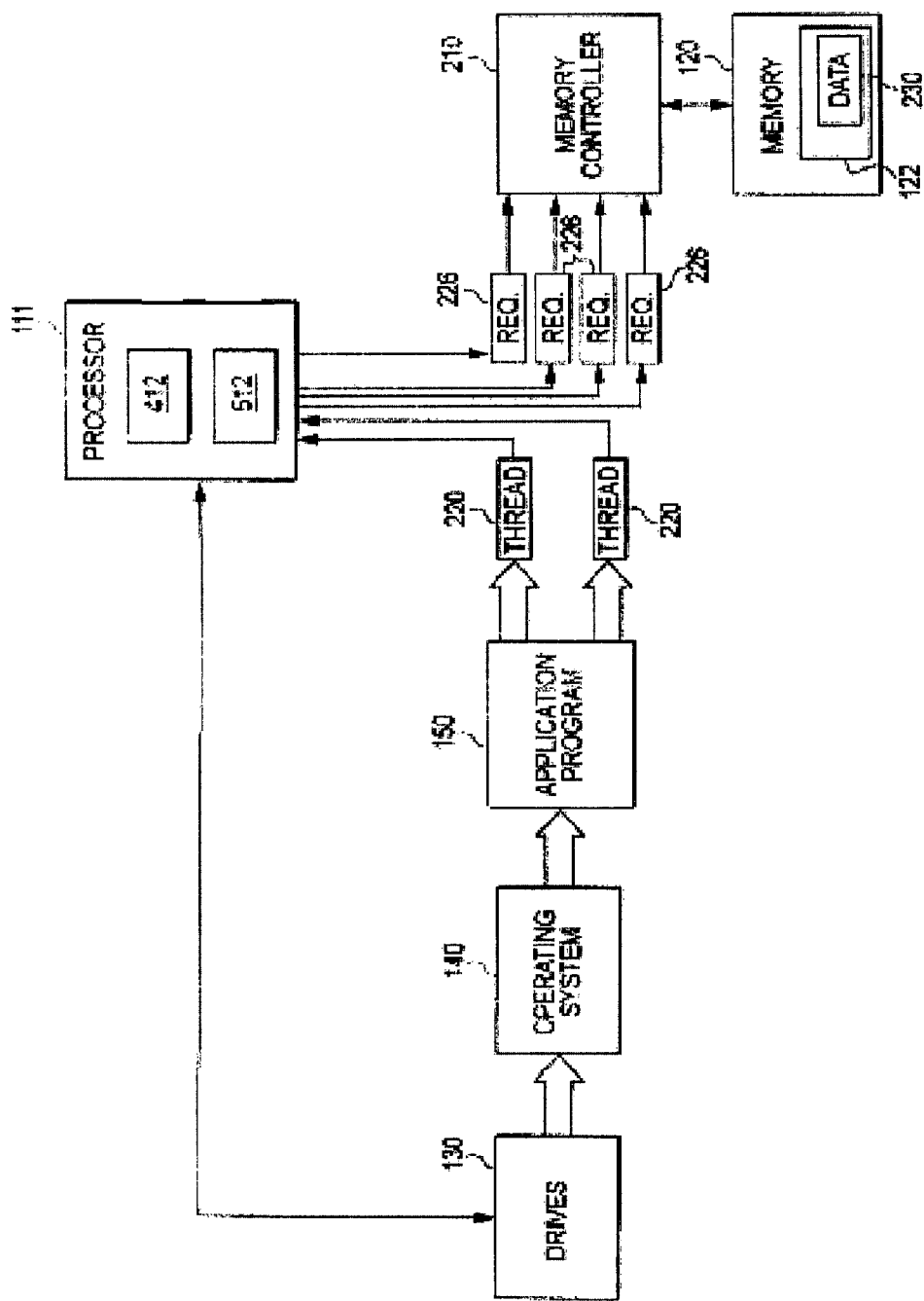
FIG. 2 illustrates an application program being executed by an operating system.

FIG. 2 illustrates an application program being executed by an operating system in accordance with at least some embodiments of the present disclosure. As shown in FIG. 2, operating system 140 may execute an application program 150 from drives 130. Operating system 140 and/or application programs 150, for example, may include program instructions for causing the computer 100 to carry out the functions and/or operations specified in FIG. 4. Application program 150 may be any application, program, portion of a program, or thread, which may be executed by operating system 140 in multiprocessor 111. Application program 150 may load data 230 into memory 120 and accesses data 230 from memory 120 using a memory controller 210. Application program 150 may run multiple sub-applications called threads 220 to accomplish a task, such as loading and accessing data 230 into and from memory bank 122 of memory 120 using one or more requests 226. Threads 220 may be executed by application program 150. Application program 150 may divide the execution of a task into as many threads 220 as application programs deems necessary to accomplish that task. For example, if application program 150 is a word processing program with a document having multiple pages, and application program 150 may be configured to accomplish the task of spell checking each page of the document, application program 150 may divide the task of spell checking the document into multiple threads 220 such that each thread 220 may spell check a portion of the document. Each thread 220 may be sent to multiprocessor 111 for execution. When executed within the multiprocessor 111, each thread 220 may produce requests 226 for data 230 within memory 120. The requests 226 may be sent to memory controller 210, which may organize the requests 226 so that multiprocessor 111 may be configured to operate efficiently.

In some embodiments, as shown in FIG. 2, multiprocessor 111 may include processors that may simultaneously execute more than one thread 220. Multiprocessor 111 may include multiple processors known as cores 412 and 512, or a single processor (only one of 412 or 512) which may run multiple threads 220 simultaneously, also known as a multithreaded processor. FIG. 2 illustrates an example multiprocessor 111 including two cores 412 and 512, but is not limited to any particular number of cores. The term "core" may be used herein to refer to any device which may process a single thread and may refer to a processor or a portion within a processor that may process a single thread. A multithreaded processor may be referred to as a processor having multiple cores. A computer 100 having multiple processors may be referred to herein as a computer 100 having multiple cores.

Figure 3:
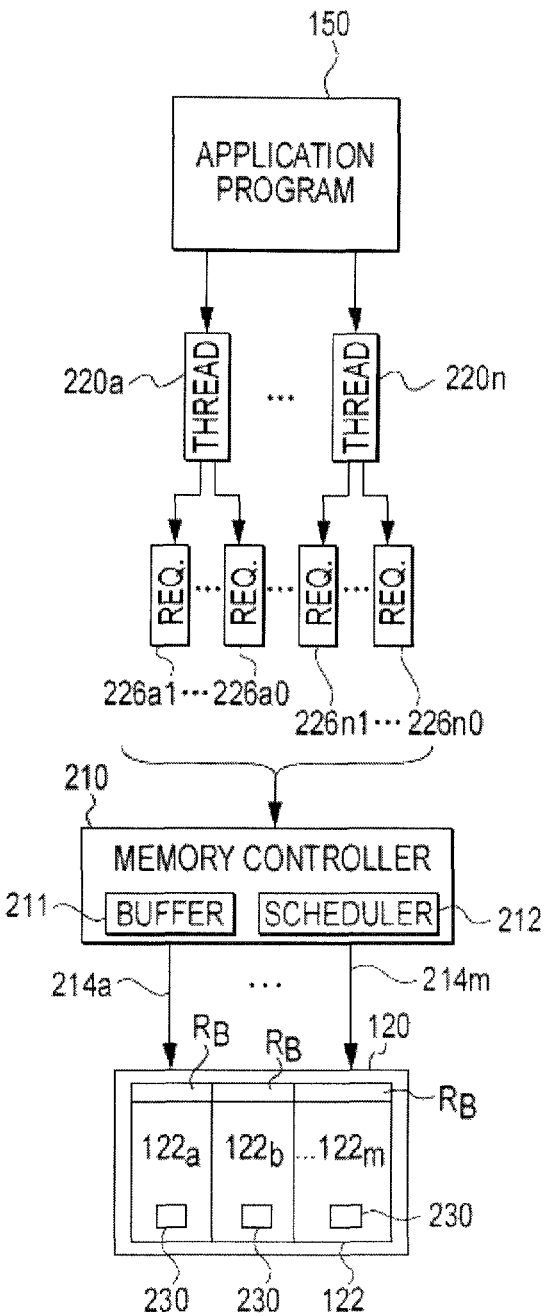
FIG. 3 illustrates a schematic representation of an application program being divided into threads which issue requests sent to a memory controller, including a detailed view of a thread scheduler of an operating system or an application program in FIG. 3A.

FIG. 3 illustrates a schematic representation of an application program being divided into threads which may issue requests sent to a memory controller in accordance with at least some embodiments of the present disclosure. As shown in FIG. 3, application 150 may be divided into multiple threads $220_a$-$220_n$, where n may represent the number of threads 220, and wherein each thread may perform a task for application 150 and may be executed on, for example, multiprocessor 111 of FIG. 2. The multiprocessor may be configured to receive and execute multiple threads $220_a$-$220_n$, individually or simultaneously, from application program 150. Each thread 220 executed on the multiprocessor may be executed independently from each other thread 220 and may issue multiple requests $226_{a1}$-$226_{no}$ for data 230 stored in memory 120, where the first index (a . . . n) represents the thread 220 associated with the request 226, and the second index (1 . . . o) represents the number of requests 226 associated with a particular thread 220.

Each thread 220 may issue requests 226 for data 230 stored in memory 120, and in an example, for data 230 stored in memory banks $122_a$-$122_m$ within memory 120, where the index (a, b . . . m) may represent the number of memory banks 122. Memory 120 may include multiple memory banks $122_a$ to $122_m$ that may allow multiple outstanding memory requests 226 to proceed in parallel if they seek data 230 from different memory banks. As a result, first memory bank $122_a$ and second memory bank $122_b$ may be accessed concurrently by memory controller 210 upon receiving a request 226 for data 230.

Each memory bank 122 may be a two-dimensional array, including columns $C_1$ to $C_i$, where the index (1 . . . i) may represent the number of columns, and rows $R_1$ to $R_j$, where the index (1 . . . j) may represent the number of rows. Rows may store data in consecutive memory locations and may be, for example, approximately 1-2 kilobytes (KB) in size. The data 230 in a memory bank 122 may be accessed from a row-buffer $R_B$, which may contain at most one row. In an example, each memory bank 122 may contain one row-buffer $R_B$. The time it takes to service each request 226 for data 230 may depend on the status of each row-buffer $R_B$ and may fall into one of three categories. The first category may be row hit, where a request 226 may be to a row that may be currently open in each row-buffer $R_B$, allowing the memory controller 210 to issue only a read or write command to the respective memory bank 122, resulting in a bank access latency of $t_{CL}$.

The second category may be row closed, where there may be no open row in a row-buffer $R_B$, so that the memory controller 210 may need to first issue an activate command to open a required row and then a read/write command, resulting in a total latency of $t_{RCD}$+$t_{CL}$, where $t_{RCD}$ is the latency for the activate command and $t_{CL}$ is the latency for the read/write command. The third category may be row conflict, where a request 226 may be to a row different from the one currently in a respective row-buffer $R_B$, so that the memory controller 210 needs to first issue a precharge command and open the required row (by activating it), and issue a read/write command for data in the required row. These accesses may incur the highest total latency of $t_{RP}$+$t_{RCD}$+$t_{CL}$, where $t_{RP}$ is the latency for the row precharge (to close it), $t_{RCD}$ is the latency for the activate command and $t_{CL}$ is the latency for the read/write command.

Memory controller 210 may be arranged in communication with memory 120 and the multiprocessor and may be located anywhere along the system, including within the multiprocessor. Memory controller 210 may include a memory request buffer 211 that may be arranged to buffer the requests 226 and the data 230 while the requests 226 may be waiting to be serviced. Memory controller 210 may include a request scheduler 212 that may be arranged to select the next request 226 to be serviced. In some embodiments, request scheduler 212 may have two-levels. When selecting the next request 226 to be serviced, the request scheduler 212 may be configured to consider the state of the memory banks $122_a$-$122_m$ and the state of memory buses $214_a$-$214_m$ connecting the memory controller 210 to each memory bank 122, and the state of a request 226. A memory command for a request 226 may be scheduled by the request scheduler 212 if its scheduling does not cause any resource, such as memory banks $122_a$-$122_m$ and address/data/system bus, conflicts and does not violate any memory timing constraints. A memory command which does not cause any conflicts may be considered to be ready.

The memory controller 210 includes a request scheduler 212, which includes a request scheduling algorithm having a request batch algorithm, and request within-batch scheduling algorithm or request parallelism-aware within-batch scheduling algorithm. Alternatively, both the request within-batch scheduling algorithm and the request parallelism-aware within-batch scheduling algorithm may be employed by the request scheduling algorithm.

Figure 3A:
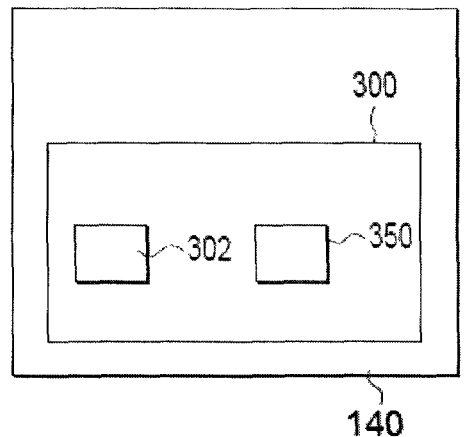

FIG. 3A includes a detailed view of operating system 140, showing parts of thread scheduling algorithm 300, including thread batch algorithm 302 and thread within-batch scheduling algorithm or thread parallelism-aware within-batch scheduling algorithm 350. An application program may contain the thread scheduling algorithm. Alternatively, both the thread within-batch scheduling algorithm and the thread parallelism-aware within-batch scheduling algorithm may be employed by the thread scheduling algorithm.

Referring again to FIG. 3, in order to improve the efficiency of scheduling requests $226_{a1}$-$226_{no}$ from threads $220_a$-$220_n$, memory controller 210, and specifically request scheduler 212, may use a request scheduling algorithm which may take into account intra-thread bank-parallelism, and may provide quality of service (QoS) to each thread $220_a$-$220_n$. Quality of service may be considered as the ability to provide different priority to different threads $220_a$-$220_n$, and/or to provide a base level of performance when executing threads $220_a$-$220_n$. The request scheduling algorithm may be designed to provide a configurable substrate for fairness and QoS and high CMP system throughput. The request batching algorithm may be configured to group a number of outstanding memory requests $226_{a1}$-$226_{no}$ into batches. The request scheduling algorithm also may be configured to ensure that all requests $226_{a1}$-$226_{no}$ belonging to current batches are serviced before the next batches are formed. The request batching algorithm may be adapted to form multiple batches all at the same time, where each batch may be formed using certain criteria, described herein.

The request batching algorithm may be arranged to group outstanding requests in the memory request buffer into sets of requests, called request batches. The memory scheduler may avoid request re-ordering across request batches by prioritizing requests belonging to a current request batch over other requests. Once all requests of a request batch are serviced, for example when the request batch is finished, the next request batch, which may include outstanding requests in the memory request buffer that were not included in the last request batch, may then be serviced. The formation of multiple request batches at the same time, may allow for re-order requests within a request batch.

The request batching algorithm may work as follows below. Each request in the memory request buffer may have an associated bit indicating which request batch the request belongs to in the current request batches. If a request belongs to a first request batch, for example, the associated bit may be set to indicate that the request belongs to the first request batch, and the request may be considered marked. Multiple request batches may be formed, where each of the requests are marked to indicate which of the multiple request batches the requests are to be placed in or are a part of, based upon certain criteria, described herein. When there are no marked requests left in the memory request buffer, for example when all requests from previous request batches have been completely serviced, new request batches may be formed.

In some embodiments, when forming a request batch, the request batching algorithm may mark up to a set number, a marking-cap, of outstanding requests per memory bank for each thread; these requests may form the request batch. The marking-cap may be utilized as a system parameter that may limit how many requests issued by a thread for a certain bank can be part of a request batch. For instance, if the marking-cap is five and a thread has seven outstanding requests for a memory bank, the request batching algorithm may mark the five oldest requests (or fewer if less than five requests exist). Examples include 2, 3, 5, 7, 10, 20, 50, or even larger marking-caps. Furthermore, for different types of batches, as described herein, the marking-caps may be different. In some examples, when no marking-cap is set, all outstanding requests may be marked when one or more batches are formed.

The request batching algorithm may be arranged to prioritize marked requests (requests in batches) over non-marked requests in a given memory bank. If there are no marked requests to a given bank, outstanding non-marked requests may be scheduled to that bank. To select among two marked or two non-marked requests, any existing or new memory scheduling algorithm, such as FR-FCFS, may be employed.

A request scheduling method for forming one or more batches of thread requests, where each request batch includes one or more requests, may be initiated. After initiating the method, threads may then be segregated into (identified as) thread types, for example first thread type and second thread type, or first, second and third thread types. One or more request batches, where each request batch may contain requests issued from the thread or threads of similar or the same thread type or types, may be formed. After forming one or more request batches, with each request batch containing one or more requests, the one or more request batches may then be executed by the memory controller. The one or more request batch may be executed one at a time, or if the computer system is capable, they may be executed more than one at a time.

The segregation (identification) of threads, and therefore the batching of requests from the different thread types, may be based on any of a number of different criteria. For example, threads may be segregated into: (1) good design threads and bad design threads, based on how well the threads are designed for use with parallel memory; (2) cooperative threads and non-cooperative threads, based on how efficiently the threads work with other threads; (3) first application, second application and third application threads, based on the application program from which the thread originated; (4) large request threads, optionally medium request threads and small request threads, based on the relative number of requests the thread makes, for example large request thread may make an average number of request or greater, and small request threads may make a number of requests less than an average number. Many other variations are possible. Accordingly, depending on the criteria selected, there may be a first thread type, a second thread type, an optional third thread type, an optional fourth thread type, etc.

The following is an example using a criteria which may result in two thread types; as noted above, more than two thread types is also possible, depending on the criteria selected. The threads may be segregated into a first thread type and a second thread type. Requests issued by each thread type, for example a first requests issued from the first thread type, and a second requests issued from the second thread type, may then be formed into one or more batches of thread requests. Each request batch may include requests of one thread type, for example a first request batch may include only first requests, and a last request batch may include second requests. In another example, each request batch may contain primarily first requests from the first thread type, or primarily second requests from the second thread type. In this manner, the request batches formed may be homogeneous or primarily homogeneous for requests from each thread type. The one or more request batches may be executed one at a time, or if the computer system is capable, they may be executed more than one at a time. The term primarily, as used herein, may be more than approximately 50%, and more than approximately 80%, more than approximately 95%, or more than approximately 99%.

Once one or more request batches are formed, the request scheduling algorithm may be arranged to employ a request within-batch scheduling algorithm or a request parallelism-aware within-batch scheduling algorithm, to schedule service of requests within a request batch. Any request within-batch scheduling algorithm may be used, such as FR-FCFS.

Within a request batch, the request parallelism-aware within-batch scheduling algorithm may be arranged to first prioritize row-hit requests. Second, requests from threads with higher rank may be prioritized over those from threads with lower rank to increase bank-level parallelism, as explained in detail herein. Finally, all else being equal, an older request may be prioritized over a younger request.

The request parallelism-aware within-batch scheduling algorithm may use a rank-based thread prioritization scheme within a request batch. When a new request batch is formed, the memory scheduler may be arranged to compute a ranking among all threads that have requests in the new request batch. While the new request batch is processed, the computed ranking may remain the same and requests from higher-ranked threads maybe prioritized over those from lower-ranked threads. The effect of ranking-based scheduling is that different threads may be prioritized in the same order across all memory banks and thus, requests of each thread may be more likely to be serviced in parallel by all banks.

Although any ranking-based scheme may be used, the specific ranking procedure may have a significant impact on CMP throughput and fairness. A good ranking scheme may effectively differentiate between memory-intensive and non-intensive threads (and threads with high bank-parallelism). In some implementations, a ranking scheme may be employed conforming to the shortest job first principle: it may rank the non-intensive threads higher than the intensive threads.

Referring again to FIG. 3 and FIG. 3A, in order to improve the efficiency of scheduling threads $220_a$-$220_n$ from application program 150 or an operating system 140, the application program 150 or the operating system 140 may be arranged to group the threads into thread batches. The thread batching algorithm 302 may be arranged to group a number of outstanding threads $220_a$-$220_n$ into thread batches. The thread scheduling algorithm 300 also may be arranged to ensure that threads $220_a$-$220_n$ belonging to current thread batches may be serviced before the next thread batches are formed. The thread batching algorithm 302 may be arranged to form multiple thread batches at the same time, where each thread batch may be formed using certain criteria, described herein.

The thread batching algorithm may be arranged to group outstanding threads into sets of threads, called batches. The application program or an operating system may avoid thread re-ordering across thread batches by prioritizing threads belonging to a current thread batch over other threads. Once threads of a thread batch are serviced, for example when the thread batch is finished, the next thread batch, which may include outstanding threads that were not included in the last thread batch, may then be serviced. The formation of multiple thread batches at the same time, may allow for re-order threads within a thread batch.

An example thread batching algorithm may work as follows. Each thread may have an associated bit indicating which thread batch the thread belongs to in the current thread batches. If a thread belongs to a first thread batch, for example, the associated bit may be set to indicate that the thread belongs to the first thread batch, and the thread may be considered marked. Multiple thread batches may be formed, where each of the threads may be marked to indicate which of the multiple thread batches the threads are to be placed in or are a part of, based upon certain criteria, described herein. When there are no marked threads left, for example when all threads from previous thread batches have been completely serviced, new thread batches may be formed.

In some embodiments, when forming a thread batch, the thread batching algorithm may be arranged to mark up to a set number, a marking-cap, of outstanding threads per core for each application program; these threads may form the thread batch. The marking-cap may be utilized as a system parameter that may limit how many threads issued by an application program for a certain core can be part of a thread batch. For instance, if the marking-cap is five and an application program has seven outstanding threads, the thread batching algorithm may mark the five oldest threads (or fewer for examples with less than five threads). Examples include 2, 3, 5, 7, 10, 20, 50, or even larger marking-caps. Furthermore, for different types of thread batches, as described herein, the marking-caps may be different. If no marking-cap is set, outstanding threads may be marked when one or more thread batches are formed.

The thread batching algorithm may be arranged to prioritize marked threads (threads in batches) over non-marked threads. If there are no marked threads, outstanding non-marked threads may be scheduled. To select among two marked or two non-marked threads, any existing or new thread scheduling algorithm, may be employed.

Figure 4:
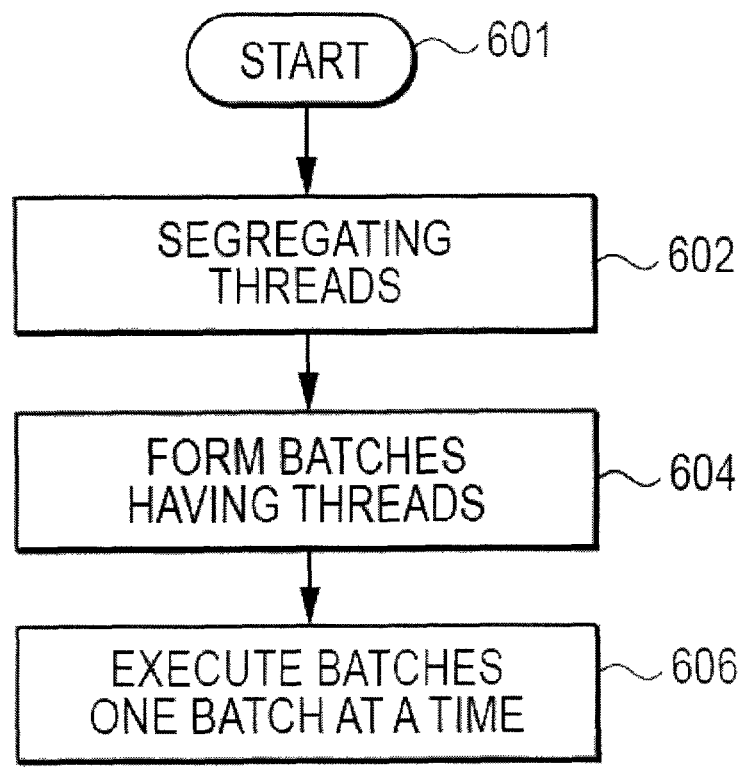
FIG. 4 depicts a flowchart illustration of methods, apparatus (systems) and computer program products.

FIG. 4 is a flowchart illustration of methods, apparatus (systems) and computer program products arranged in accordance with at least some embodiments of the present disclosure. It will be understood that each block of the flowchart illustration in FIG. 4, and combinations of blocks in the flowchart illustration in FIG. 4, may be implemented by computer program instructions. These computer program instructions may be loaded onto a computer, or processor, or other programmable data processing apparatus to produce a machine, such that the instructions which execute on the computer, or processor or other programmable data processing apparatus create means for implementing the functions specified in the flowchart block or blocks. These computer program instructions may also be stored in a storage device that may direct a computer, or processor, or other programmable data processing apparatus to function or operate in a particular manner, such that the instructions stored in the storage device produce an article of manufacture including instruction means which may implement the function and/or operation specified in the flowchart block or blocks. The computer program instructions may also be loaded onto a computer, or processor, or other programmable data processing apparatus to cause a series of operational steps to be performed on the computer, or processor, or other programmable data processing apparatus, to produce a computer implemented process such that the instructions which execute on the computer, or processor, or other programmable apparatus provide steps for implementing the functions and/or operations specified in the flowchart block or blocks.

Accordingly, blocks of the flowchart illustration in FIG. 4 support combinations of means for performing the specified functions, combinations of steps for performing the specified functions and program instruction means for performing the specified functions and/or operations. It will also be understood that each block of the flowchart illustration in FIG. 4, and combinations of blocks in the flowchart illustration in FIG. 4 may be implemented by special purpose hardware-based computer systems which perform the specified functions/operations/actions or steps, or combinations of special purpose hardware and computer instructions.

Such computer instructions may be fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system.

Those skilled in the art should appreciate that such computer instructions may be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over the network (for example, the Internet or World Wide Web).

As shown in FIG. 4, a method 600 for forming one or more batches of threads, where each thread batch includes one or more threads, may be initiated at block 601. After initiating the method 600, threads may then be segregated into (identified as) thread types, for example first thread type and second thread type, or first, second and third thread types, at block 602. One or more thread batches, where each thread batch may contain threads issued from an application program or an operating system, with threads of similar or the same thread type or types, may be formed at block 604. After forming one or more thread batches, with each thread batch containing one or more threads, the one or more thread batches may then be executed by the cores at block 606. The one or more thread batch may be executed one at a time, or if the computer system is capable, they may be executed more than one at a time.

The segregation (identification) of threads, and therefore the batching of threads of the different thread types, may be based on any of a number of different criteria. For example, threads may be segregated into: (1) good design threads and bad design threads, based on how well the threads are designed for use with parallel memory; (2) cooperative threads and non-cooperative threads, based on how efficiently the threads work with other threads; (3) first application, second application and third application threads, based on the application program from which the thread originated; (4) large request threads, optionally medium request threads and small request threads, based on the relative number of requests the threads make, for example large request thread may make an average number of request or greater, and small request threads may make a number of requests less than an average number. Other criteria for grouping threads into batches may include assigning an importance to each thread, for example high importance or low importance, or assigning an importance values and batching threads with similar or the same importance values, together. Still other criteria for grouping threads into thread batches may include grouping based on past compatibility data collected when previously executing the threads, with the data stored in a ghost page associated with each thread; or the data may be stored in a freeze dried ghost page provided as part of the application program from which the thread issued, the freeze dried ghost page containing compatibility data of the threads provided with the application program. Many other variations are possible. Accordingly, depending on the criteria selected, there may be a first thread type, a second thread type, an optional third thread type, an optional fourth thread type, etc.

Figure 5:
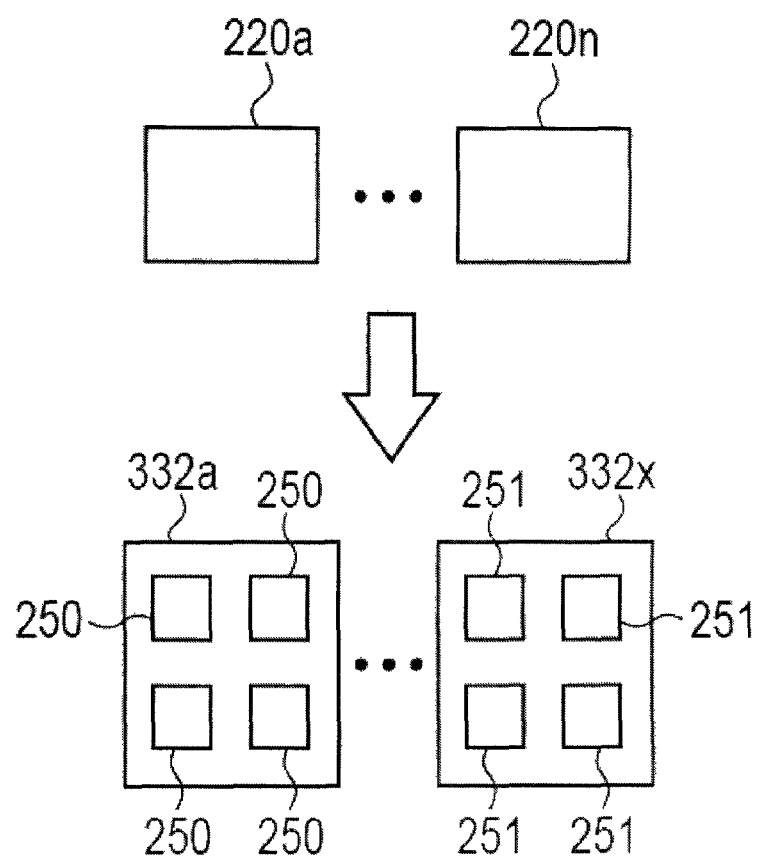
FIG. 5 depicts a schematic representation of threads being arranged in batches; all arranged in accordance with at least some embodiments of the present disclosure.

FIG. 5 depicts a schematic representation of threads being arranged in thread batches in accordance with at least some embodiments of the present disclosure. Illustrated is an example using a criteria which results in two thread types; as noted above, more than two thread types is also possible, depending on the criteria selected. The threads $220_a$-$220_n$ may be segregated into first thread type 250 and second thread type 251. Threads issued by each application program or the operating system, for example first threads of the first thread type 250, and second threads of the second thread type 251, may then be formed into one or more thread batches $332_a$-$332_x$ of threads. Each thread batch may include threads of only one thread type, for example first thread batch $332_a$ may include only first threads of the first thread type 250, and last thread batch $332_x$ may include only second threads of the second thread type 251, as illustrated. In another example, each thread batch $332_a$-$332_x$ may contain primarily first threads of the first thread type 250, or primarily second threads of the second thread type 251. In this manner, the thread batches $332_a$-$332_x$ formed are homogeneous or primarily homogeneous for threads of each thread type. The one or more thread batch may be executed one at a time, or if the computer system is capable, they may be executed more than one at a time. The term primarily, as used herein, may be more than approximately 50%, and more than approximately 80%, more than approximately 95%, or more than approximately 99%.

Once one or more thread batches are formed, the thread scheduling algorithm may employ a thread within-batch scheduling algorithm or a thread parallelism-aware within-batch scheduling algorithm, to schedule service of threads within a thread batch.

The thread parallelism-aware within-batch scheduling algorithm may use a rank-based thread prioritization scheme within a thread batch. When a new thread batch is formed, the memory scheduler may be arranged to compute a ranking among all threads in the new batch. While the new batch is processed, the computed ranking may remain the same and higher-ranked threads may be prioritized over lower-ranked threads.

Although any ranking-based scheme may be used, the specific ranking procedure may have a significant impact. A good ranking scheme may effectively differentiate between computationally-intensive and non-intensive threads (and threads with high bank-parallelism). In some implementations, a ranking scheme may be employed conforming to the shortest job first principle: it may rank the quickly executing threads higher than the slowly executing threads.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A method to execute threads in a computer system, the method comprising:
   segregating, by an operating system, a set of threads into at least a first thread type and a second thread type based on an operating efficiency among the set of threads, wherein:
      each thread of the first thread type is adapted to extract data from a different memory bank than remaining threads of the first thread type,
      threads of the second thread type comprise remaining threads of the set of threads and are adapted to primarily extract data from a same memory bank, and
   forming a plurality of first batches, by the operating system, each first batch comprising primarily threads of the first thread type, wherein each first batch comprises primarily memory requests to different memory banks;
   executing the plurality of the first batches; and
   in response to a completion of the execution of the first batches, forming a plurality of second batches, by the operating system, each second batch comprising primarily threads of the second thread type, and wherein each second batch comprises primarily memory request to the same memory bank; and
   wherein primarily comprises more than approximately 50%.

2. The method of claim 1, wherein segregating comprises grouping the threads of the first thread type into a first grouping, grouping the threads of the second thread type into a second grouping, and grouping the threads of a third thread type into a third grouping.

3. The method of claim 1, wherein segregating comprises segregating based on how well the set of threads are designed for use with parallel processors.

4. The method of claim 1, wherein segregating comprises segregating based on which application program the thread originated.

5. A non-transitory computer storage medium that includes computer-executable instructions stored thereon which, in response to execution by a computer, adapt the computer to perform a method to execute threads in a computer system, the method comprising:
   segregating, by an operating system, a set of threads into at least a first thread type and a second thread type based on an operating efficiency among the set of threads, wherein:
      each thread of the first thread type is adapted to extract data from a different memory bank than remaining threads of the first thread type,
      threads of the second thread type comprise remaining threads of the set of threads and are adapted to primarily extract data from a same memory bank, and
   forming a plurality of first batches, by the operating system, each first batch comprising primarily threads of the first thread type that operate efficiently with each other, wherein each first batch comprises primarily memory requests to different memory banks;
   executing the plurality of the first batches; and
   in response to a completion of the execution of the first batches, forming a plurality of second batches, by the operating system, each second batch comprising primarily threads of the second thread type that do not operate efficiently with each other, wherein each second batch comprises primarily memory request to the same memory bank;
   wherein primarily comprises more than approximately 50%.

6. The non-transitory computer storage medium of claim 5, wherein execution of the threads of each first batch occurs before forming the second batches.

7. The non-transitory computer storage medium of claim 5, wherein execution of the threads of each first batch includes execution of all threads of a selected first batch, then execution of threads of any other first batch.

8. The non-transitory computer storage medium of claim 5, wherein the instructions to segregate comprise instructions to group the set of threads into three groupings, where each of the three groupings comprise threads from a respective one of the first thread type, the second thread type or a third thread type.

9. The non-transitory computer storage medium of claim 5, wherein the instructions to segregate comprise instructions to segregate based on how well the set of threads are designed for use with parallel processors.

10. A computer system, comprising:
   a processor including multiple cores and is effective to execute an operating system, the operating system adapted to segregate a set of threads into at least a first thread type and a second thread type based on an operating efficiency among the set of threads, wherein:
  each thread of the first thread type is adapted to extract data from a different memory bank than remaining threads of the first thread type,
  threads of the second thread type comprise remaining threads of the set of threads and are adapted to primarily extract data from a same memory bank, and
the operating system adapted to form a plurality of first batches, each first batch comprising primarily threads of the first thread type, wherein each first batch comprises primarily memory requests to different memory banks;
the processor adapted to execute the plurality of first batches;
in response to a completion of the execution of the first batches, the operating system adapted to form a plurality of second batches, each second batch comprising primarily threads of the second thread type, wherein each second batch comprises primarily memory request to the same memory bank; and
the processor adapted to execute the threads of each second batch, wherein the threads of each first batch are executed before the threads of each second batch are executed;
wherein primarily comprises more than approximately 50%.

11. The computer system of claim 10, wherein the processor is adapted to execute all threads of a selected first batch, then execute threads of any other first batch.

\* \* \* \* \*

UNITED STATES PATENT AND TRADEMARK OFFICE
CERTIFICATE OF CORRECTION

PATENT NO. : 8,839,255 B2
APPLICATION NO. : 12/508457
DATED : September 16, 2014
INVENTOR(S) : Memik et al.

It is certified that error appears in the above-identified patent and that said Letters Patent is hereby corrected as shown below:

On the Title Page

On Page 2, in Item (56), under "OTHER PUBLICATIONS", in Column 2, Lines 26-27, delete "Achitectures", in Proc. of International Sympsoium on Microachitecture" and insert -- Architectures", in Proc. of International Symposium on Microarchitecture --, therefor.

On Page 2, in Item (56), under "OTHER PUBLICATIONS", in Column 2, Line 33, delete "Mangement"," and insert -- Management", --, therefor.

On Page 2, in Item (56), under "OTHER PUBLICATIONS", in Column 2, Line 47, delete "Managerment" and insert -- Management --, therefor.

On Page 3, in Item (56), under "OTHER PUBLICATIONS", in Column 1, Line 8, delete "Muti-Core" and insert -- Multi-Core --, therefor.

On Page 3, in Item (56), under "OTHER PUBLICATIONS", in Column 2, Line 46, delete "Conjuntion" and insert -- Conjunction --, therefor.

On Page 4, in Item (56), under "OTHER PUBLICATIONS", in Column 1, Line 7, delete "Monerey," and insert -- Monterey, --, therefor.

On Page 4, in Item (56), under "OTHER PUBLICATIONS", in Column 1, Line 29, delete "Of" and insert -- of --, therefor.

On Page 4, in Item (56), under "OTHER PUBLICATIONS", in Column 1, Line 51, delete "Northestern" and insert -- Northwestern --, therefor.

On Page 5, in Item (56), under "OTHER PUBLICATIONS", in Column 2, Line 19, delete "PrOgram" and insert -- Program --, therefor.

Signed and Sealed this
Twenty-fourth Day of March, 2015

Michelle K. Lee
*Director of the United States Patent and Trademark Office*